United States Patent
Jones et al.

(10) Patent No.: US 6,680,994 B2
(45) Date of Patent: Jan. 20, 2004

(54) MONITORING THE CONTENTS OF A CONTAINER BY ULTRASONIC MEANS

(75) Inventors: Gordon Rees Jones, Wirral (GB); Keith Woolley, Beckermet (GB); Joseph William Spencer, Liverpool (GB); Gary Jones, Warrington (GB); Perminder Tony Singh, Chatham (GB); Robert McAlpine Dickson, Appleton (GB); John Raymond Gibson, Liverpool (GB)

(73) Assignee: British Nuclear Fuels PLC, Risley (GB)

( * ) Notice: Subject to any disclaimer, the term of this patent is extended or adjusted under 35 U.S.C. 154(b) by 0 days.

(21) Appl. No.: 10/139,463

(22) Filed: May 6, 2002

(65) Prior Publication Data

US 2002/0159557 A1 Oct. 31, 2002

Related U.S. Application Data

(63) Continuation of application No. 09/508,879, filed as application No. PCT/GB98/02794 on Sep. 21, 1998.

(30) Foreign Application Priority Data

Sep. 19, 1997 (GB) ............................................... 9719940

(51) Int. Cl.$^7$ .............................................. G21C 17/00

(52) U.S. Cl. ...................... 376/250; 376/251; 376/252; 376/253; 376/272; 376/450; 376/245; 73/24.01; 73/570.5; 73/597; 73/602; 73/603; 73/632

(58) Field of Search .................................. 376/245, 250, 376/251, 252, 253, 450, 272; 73/24.01, 570.5, 597, 602, 603, 632

(56) References Cited

U.S. PATENT DOCUMENTS

| 3,791,200 | A | | 2/1974 | Hayre ........................ 73/67.1 |
| 3,937,068 | A | * | 2/1976 | Joy .............................. 73/636 |
| 3,945,245 | A | * | 3/1976 | Stehle et al. ................. 73/71.4 |
| 3,981,176 | A | | 9/1976 | Jacobs ........................... 73/24 |
| 4,039,375 | A | * | 8/1977 | Worlton et al. ............... 176/19 |
| 4,203,324 | A | * | 5/1980 | Baumoel ................. 73/290 V |
| 4,312,707 | A | * | 1/1982 | Miyazawa .................. 376/450 |
| 4,320,659 | A | * | 3/1982 | Lynnworth et al. .......... 73/589 |
| 4,384,489 | A | * | 5/1983 | Crutzen et al. ............... 73/602 |
| 4,424,703 | A | * | 1/1984 | Winter et al. ............. 73/24.01 |
| 4,470,299 | A | * | 9/1984 | Soltz ....................... 73/290 V |
| 4,491,008 | A | * | 1/1985 | Marini et al. .................. 73/19 |
| 4,530,241 | A | * | 7/1985 | Crutzen et al. ............... 73/602 |
| 4,657,728 | A | * | 4/1987 | Coppa et al. ............... 376/248 |
| 4,659,544 | A | * | 4/1987 | Sawayama et al. ......... 376/451 |
| 4,684,493 | A | * | 8/1987 | Gravelle ..................... 376/252 |

(List continued on next page.)

FOREIGN PATENT DOCUMENTS

| DE | 2479448 | * | 3/1980 | |
| DE | 3525946 A1 | * | 1/1987 | |
| EP | 0051016 | * | 4/1982 | .......... G21C/17/06 |
| EP | 0 087365 A1 | | 8/1983 | |
| EP | 0225653 | * | 10/1986 | |
| GB | 673 447 | | 6/1952 | |
| GB | 130 2731 | | 1/1973 | |
| GB | 2192059 A | | 12/1987 | |
| JP | 032555 | | 9/1991 | |
| JP | 03205555 | | 9/1991 | |
| WO | WO 97/27459 | | 7/1997 | |

*Primary Examiner*—Michael J. Carone
*Assistant Examiner*—John Richardson
(74) *Attorney, Agent, or Firm*—Workman Nydegger (57) ABSTRACT

The contents of a container 1 are non-intrusively monitored by probing the container with an ultrasonic signal, and measuring changes in the ultrasound signature of the received signal after the signal has passed through the contents of the container.

21 Claims, 8 Drawing Sheets

U.S. PATENT DOCUMENTS

| | | | | |
|---|---|---|---|---|
| 4,758,803 A | | 7/1988 | Thomas, III | 331/65 |
| 4,826,650 A | * | 5/1989 | Richardson et al. | 376/249 |
| 5,150,334 A | * | 9/1992 | Crosby | 367/98 |
| 5,255,564 A | | 10/1993 | Glad et al. | 73/597 |
| 5,359,541 A | | 10/1994 | Pope et al. | 364/497 |
| 5,392,635 A | * | 2/1995 | Cadet et al. | 73/24.01 |
| 5,410,518 A | * | 4/1995 | Birkett | 367/87 |
| 5,456,108 A | * | 10/1995 | Birkett | 73/290 V |
| 5,473,934 A | | 12/1995 | Cobb | 73/61.49 |
| 5,501,098 A | * | 3/1996 | Cadet et al. | 73/24.01 |
| 5,604,301 A | * | 2/1997 | Mountford et al. | 73/54.31 |
| 5,625,140 A | | 4/1997 | Cadet et al. | 73/24.01 |
| 5,692,024 A | * | 11/1997 | McClelland et al. | 376/245 |
| 5,761,955 A | * | 6/1998 | Lichtenfels et al. | 73/290 V |
| 5,790,617 A | * | 8/1998 | McClelland | 376/252 |
| 5,987,994 A | * | 11/1999 | Maltby et al. | 73/646 |
| 6,016,701 A | * | 1/2000 | McClelland et al. | 73/620 |
| 6,202,484 B1 | * | 3/2001 | Willner et al. | 73/290 V |
| 6,234,023 B1 | * | 5/2001 | Collins et al. | 73/597 |

* cited by examiner

MONITORING THE CONTENTS OF A CONTAINER BY ULTRASONIC MEANS

CROSS-REFERENCE TO RELATED APPLICATIONS

This application is a continuation of U.S. patent application Ser. No. 09/508,879, filed on Mar. 16, 2000, which is a nationalization of International Application No. PCT/GB98/02794, filed Sep. 21, 1998, which claims priority to Great Britain Application No. 9719940.0, filed Sep. 19, 1997, which applications are hereby incorporated by reference.

BACKGROUND OF THE INVENTION

1. The Field of the Invention

This invention relates to apparatus and methods for monitoring, non-intrusively, the contents of a container containing fluid. The invention relates particularly, but not exclusively, to a method of non-intrusively monitoring the gaseous contents of a container in order, for example, to confirm the composition or purity of the gas within the container.

2. The Relevant Technology

It is often important to be able to monitor and confirm the composition or purity of gas contained within a container in order to monitor possible events, such as corrosion of the container, or to detect a leakage of the gas contained within the container or the leakage of a gas into the container. This may be particularly important when the gas or other contents of the container are toxic or in some other way harmful.

The invention therefore has particular application in, for example, the nuclear industry where the storage of radioactive substances requires continual or periodic monitoring of storage conditions to confirm continuous safe storage.

It may also be useful to non-intrusively monitor the contents of a container holding hazardous fluid or solid in the form of, for example, flammable, biological or pharmaceutical materials.

The invention may also be useful in monitoring the contents of containers in the vicinity of potentially hazardous processes such as in the operation of high voltage switch gear where gas within containers provides electrical insulation for the switchgear.

Known methods and apparatus for monitoring the gaseous contents of a container in order to confirm the composition of the gas within the container require penetration of the container in order to sample the gas contained within the container or in order to introduce a sensor into the container.

A problem with such known methods and apparatus is that because it is necessary to penetrate the container, there is a risk that leakages from the container occur around the area where penetration has taken place. Such systems, in seeking to establish that no leakage is occurring have to generate a potential site for leakage. This is technically undesirable and a potential problem with regulatory authorities.

Spent nuclear fuel is highly radioactive and it is necessary to appropriately deal with the fuel to ensure that the radioactive spent fuel does not contaminate the environment.

There is a requirement to be able to safely store spent nuclear fuel for an intermediate period known as "interim storage" which period may be prolonged if required, pending a decision as to whether reprocessing or disposal of the fuel is to be undertaken. Spent fuel is typically stored within a sealed container during such storage.

Typically, a container suitable for interim storage of spent fuel comprises a canister made of pressure vessel grade steel within which the spent fuel is held. The canister incorporates radioactive shielding in its lid. Once the canister has been filled with spent fuel, it is fitted with a lid and welded. The final welding of the lid seals the fuel. The lid of the canister will typically have a double seal. Prior to final sealing of the lid, the canister is filled with helium so that the spent fuel is held in a sealed container in a helium atmosphere.

To provide further radiation shielding the canister is placed in a concrete storage cask which is also fitted with a lid. The canister may be positioned within a concrete cask such that there is a space between the canister and the cask. The cask has inlet ports at the bottom and outlet ports at the top so that air may flow within the concrete cask in order to cool the canister.

The concrete outer cask provides shielding for both gamma and neutron radiation and protection against external hazards.

It is desirable to be able to, from time to time, monitor the contents of the canister in order to ensure that no untoward reactions are occurring within the canister. Such checks would also indicate the continued integrity of the fuel cladding in the canister.

A known method of monitoring spent fuel within a sealed canister or dual purpose metal cask involves opening the sealed canister to examine the fuel and the atmosphere surrounding the fuel known as the cover gas within the canister.

A disadvantage with this known method is that there is a risk of contamination to the surroundings and the facilities required are extensive and expensive. In addition, it is neither easy nor practical to be able to continuously monitor the canister and contents thereof using such a method.

A second known method of monitoring spent fuel within a canister is through use of an installed penetration by which it is possible to attach instrumentation to measure the pressure or quality of the cover gas over the spent fuel or the seal interspace gas. Measurement of such gases will provide information relating to the chemical composition of the cover gas in the canister.

A disadvantage of this known method is that the presence of the penetration prejudices or degrades the integrity of the containment barrier of the canister thus providing a potential leak which could lead to radioactive contamination.

BRIEF SUMMARY OF THE INVENTION

According to a first aspect of the present invention, there is provided a method for non-intrusively monitoring the contents of a sealed container comprising steps of:

transmitting an ultrasonic signal through a wall of the container into the contents of the container, receiving a signal from within the container, and analysing the received signal thereby deducing the composition of the contents of the container. This can thus be achieved without having to unseal the container.

According to a second aspect of the present invention there is provided apparatus for non-intrusively monitoring the contents of a sealed container the apparatus comprising:

transmitter means for transmitting an ultra-sonic signal through a wall of the container into the contents of the container;

receiving means for receiving a signal from within the container;

analysing means for analysing the received signal thereby deducing the composition of the contents of the container.

By means of the present invention it is possible to measure at intermittent intervals the quality of the atmosphere within a container.

The canister may be a substantially gas tight canister. The canister may be a metal canister, for instance of carbon steel or stainless steel.

The canister may be formed of a body and one or more lid elements. The one or more lid elements may be sealed to the body in use. Preferably a first lid is provided, together with a second outer lid. Preferably the first lid is received within the opening to the canister. The first and/or second lid may rest on one or more internal lips provided by the canister. The one or more lid elements may be welded to the body. The welds may provide a gas tight seal between a first lid and the canister and a second lid and the canister.

Preferably the canister has the general form of a right cylinder. Preferably the lids are provided on the top end of the canister, most preferably within the profile of the side wall of the canister, such that an end wall of the side wall is exposed.

Preferably the canister contains spent nuclear fuel rods or other irradiated nuclear material.

The canister may be provided with an internal gas pressure of greater than ambient, a positive pressure. The positive pressure may be at least 1.1 atmospheres, more preferably at least 1.2 atmospheres. Preferably the gas in the canister is substantially helium.

Preferably the canister is provided within a further container in use. The outer container may be a cask, for instance a concrete cask. Preferably the internal configuration of the outer container generally matches the outer configuration of the canister.

The outer container may be provided with a lid to seal the body of the container following insertion of the canister.

Preferably the outer container is provided with a supply of cooling gas to its interior. Preferably the cooling gas directly cools the outside of the canister. The cooling gas is preferably air. An inlet to the inside of the outer container and an outlet therefrom may be provided. Preferably the inlet and outlets are dog-legged.

The invention may be used to measure the fluid contents of a container and may therefore be used to monitor a gaseous or liquid content of a container. The invention may be used to measure the presence of one or more components of a gas. For instance, the presence of air in an helium atmosphere or the presence of xenon and/or krypton in an helium atmosphere may be measured. The invention may be used to measure the level of one or more components of a gas. For instance, the level of air in an helium atmosphere may be measured or the level of xenon and/or krypton in an helium atmosphere may be measured.

Advantageously, the method comprises the steps of measuring the sound velocity and/or attenuation of the transmitted signal and/or the reflected signal. The sound velocity and/or attenuation may be considered at more than one frequency of transmitted signal.

By measuring velocity and attenuation at least two different frequencies of transmitted signal, unknown quantities in the calculations/algorithms required to derive information regarding a composition of the contents are eliminated from the calculations. The method may measure the velocity and/or attenuation using transmission measurements. The method may measure the velocity and/or attenuation using reflected measurements. Conveniently, the method comprises the step of measuring velocity and attenuation of both a transmitted signal, such as a "line of sight" received signal, and a reflected signal.

The transmitted ultrasound signal may be provided by a transducer.

Preferably the ultrasound source and/or receiver therefore is removed from the canister between at least some of the tests. The transmitter and/or receiver may be removed whenever the time period between tests exceeds 1 hour, or more preferably 1 day.

Preferably a calibration and/or checking station is provided for the transmitter and/or receiver and/or accompanying electronics between at least some of the tests. Preferably such checks are made when tests are separated by more than 1 hour and more preferably by more than 1 day.

Conveniently, the source of the transmitted signal is positioned outside the container, and a receiver is positioned outside the container. The source of the signal and/or receiver are preferably mounted on the lid of the container. The source of the signal and/or receiver may be mounted on a side wall of the container, preferably on the top of the side wall. The source of the signal and/or receiver are preferably provided in a housing.

The housing may be mounted on the lid of the canister, for instance the outer lid or the inner lid.

The housing may be mounted on the outer surface of the outer lid, with a passage connecting the monitoring location in the housing to the body of gas within the canister, the passage being provided in a passage defining element which passes through the lid or lids, the cross-sectional profile of the passage defining element as it passes through at least a part of a lid being less than the cross-sectional profile of the housing, parallel to the lid. Preferably the cross-sectional profile is less throughout the elements passage through the outer lid, and if present the inner lid.

The housing may be mounted on the outer surface of the inner lid, with a passage connecting the monitoring location in the housing to the body of gas within the canister, the passage being provided in a passage defining element which passes through the inner lid, the cross-sectional profile of the passage defining element as it passes through at least a part of the inner lid being less than the cross-sectional profile of the housing, parallel to the lid. Preferably the cross-sectional profile is less throughout the elements passage through the inner lid. Preferably the cross-sectional profile of the housing as it passes through the outer lid is substantially the same as the housings cross-sectional profile outside the outer lid.

The housing may be mounted on the end wall of the side wall of the canister, most preferably wholly within the outline of the extension of that side wall. The housing may be welded to the canister. The housing may be formed of one or more different materials.

The received signal is preferably subjected to signal processing to extract the desired information. The signal processing may involve Fast Fourier Transform and/or chromatic based processing. The signal processing may involve the application of one or more Gaussian processors to the signal. The processors are preferably nonorthogonal. Preferably the processors cover the range of transmitted and/or received signal frequencies. Three processors may be applied. Preferably the processor outputs are further processed algorithmically. Preferably the algorithm results corresponding to the nominal energy content of the signal and/or the dominant frequency and/or the effective bandwidth, most preferably all three.

The signal may be represented as a point on a three dimensional plot defined by the nominal energy content of the signal, the dominant frequency and the effective bandwidth.

The condition within the container may be represented as a point on a three dimensional plot. The change in conditions may be represented as a deviation in one or more dimensions relative to that point. The extent of the deviation may represent the magnitude of the change in conditions. The direction of the deviation may represent the type of change in conditions.

Alternatively however the transmitter may be positioned within the container and may be activated by, for example, a signal transmitted from outside the container.

A transmitter suitable for positioning within the container may comprise, for example, a tuning fork or resonant cavity.

The canister will normally be filled with helium at a pressure of about 1¼ atmospheres at the time of sealing the canister. By means of the present invention, it is possible to confirm the continued presence of helium, the absence of atmospheric gases principally oxygen, the absence of fission product gases. It is also possible to discriminate between oxygen and fission product gases, so indicating the type of failure occurring.

The continued presence of helium, which is a highly mobile gas, will confirm that the canister is still satisfactorily sealed.

The absence of oxygen will confirm that corrosion of the external surface of the canister has been inhibited.

The absence of fission product gases will confirm that no deterioration of fuel integrity has taken place since the loading of the spent fuel into the canister.

By transmitting ultrasonic sound waves into the canister and receiving waves back from the canister (waves which have passed through the internal gas) the effects of variation in gas temperature can be allowed for, and the nature and amount of any foreign gas identified.

The internal gas at a monitoring location may be investigated. The monitoring location may be within the body of the canister. The monitoring location is preferably provided outside the body of the canister, but still sealed relative to the surrounding environment. Preferably the monitoring location is provided with a housing, most preferably the housing for the transmitter and/or receiver for the ultrasound. Preferably the monitoring location is provided in proximity to the outside of the canister lid.

The monitoring location is preferably connected to the internal body of gas in the canister via a bore or other passageway. The bore may be of circular cross-section. Preferably the bore includes one or more dog-legs. Preferably the bore passes from within the canister body to outside. The bore most preferably passes through the lid or lids of the canister. The bore may alternatively pass through the side wall of the canister. The bore may pass up through the side wall of the canister, towards the lid end of the canister. The bore may pass through the side wall of the canister, for instance to connect to an element externally provided on the canister and leading to the monitoring location.

The monitoring location is preferably in proximity to the transmitter and/or receiver. Ideally the monitoring location is provided between the transmitter and the receiver. The transmitter and receiver may be separated by a gap of between 0.5 and 20 cm or more preferably 3 and 8 cm.

The transmitter and/or receiver are preferably separated from the monitoring location by a thickness of material. The material thickness is preferably at least 5 mm and more preferably at least 10 mm or even 20 mm.

Preferably a volume of gas is provided in the housing on the distal side of the monitoring location relative to the body of the canister. Preferably the body of gas has a greater extent, perpendicular to the bore supplying it and/or parallel to the axis of the transmitter/receiver alignment, than the monitoring location itself. A disc shaped gas volume may be provided. In this way reduction of noise is facilitated.

It has previously been thought impossible to use sound or ultrasonic waves to determine the contents of a canister due to the fact that the temperature of the gas within the canister will affect the characteristics of reflected sound waves.

In addition, in order to be able to deduce the composition of the fluid within the container, the signal sound wave has to travel through a thick container wall without unacceptable signal loss. It had previously been thought that the attenuation of signals due to the thickness and nature of the canister material would be an insurmountable problem in using ultra-sonic signals to determine the contents of the container.

In addition, further problems associated with the method of the present invention include attenuation of the signal due to the impedance mismatching at changes of material. Further, a large amount of noise is generated by spurious internal reflections of the signal.

The physical properties of helium, oxygen and krypton/xenon (the principle fission product gases) in terms of atomic weight, molecular weight and bonding characteristics are sufficiently different to one another to allow reliable discrimination at the levels which would be expected within a canister containing spent fuel.

The present invention therefore provides a method where ultra-sound is transmitted through a container wall which may be metallic and may have considerable thickness, or alternatively may be a non-metallic material.

The ultra-sound may traverse through the gas or fluid within the container and then be received and detected through the container wall at a different point to that of which the ultrasound was transmitted into the canister wall initially. Alternatively, it may be received and detected at the same point at which it was transmitted through the canister wall following reflection of the signal.

The passage of the signal through the gas atmosphere or fluid will have modified the signal signature so by comparing the transmitted and received signals the composition of the gas or fluid may be inferred In particular, the speed of sound, its attenuation and its frequency may be modified by differences in gas or fluid composition.

Alternatively, the resonance frequencies of the container and internal structures will be altered by the contained gas or fluid composition and this change may be used to infer the composition.

The signal may be produced by means positioned outside the canister for example a transmitter.

Alternatively, the signal may be produced from transmission means contained within the canister. Such transmission means may be in the form of, for example, a tuning fork or resonant cavity which may be activated from outside the container.

BRIEF DESCRIPTION OF THE DRAWINGS

The invention will now be further described, by way of example only, with reference to the accompanying drawings in which.

DETAILED DESCRIPTION OF THE PREFERRED EMBODIMENTS

Figure 1:
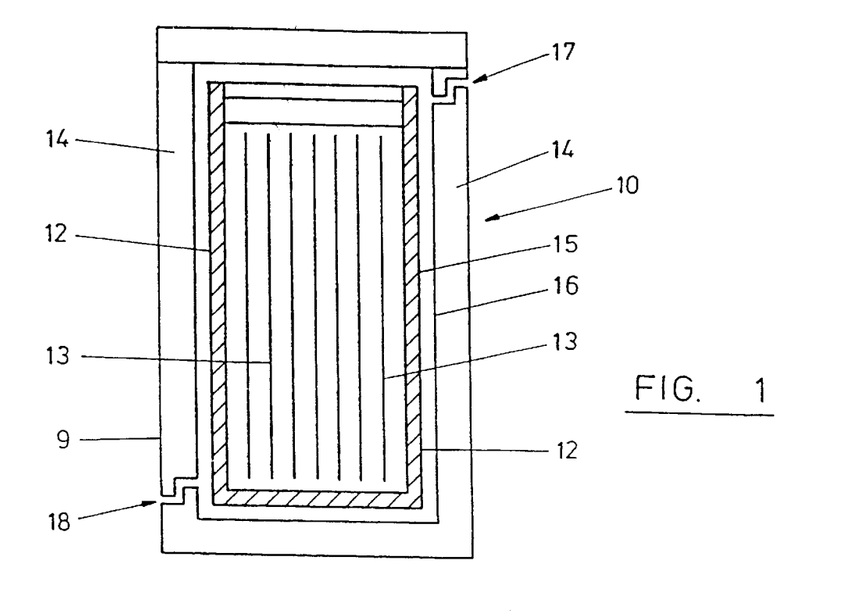
FIG. 1 is a schematic representation of canister containing spent fuel monitored by means of an embodiment of the present invention.

Referring to FIG. 1, a container suitable for storing spent fuel is designated generally by the reference numeral 10. The container comprises a canister 12 which is loaded with spent fuel rods 13 and is then is sealed with a welded lid. Once the spent fuel 13 is sealed within the canister 12 the canister 12 is vacuum dried then back filled with an inert gas, such as helium, which surrounds the spent fuel rods 13. Thermal conduction from the fuel rods 13 within the canister 12 is enhanced through the use of the helium atmosphere at a pressure slightly above atmospheric.

Once loaded with spent fuel the canister 12 is positioned within a concrete cask 14 such that the outer surface 15 of the canister 12 and the inner surface 16 of the cask 14 are spaced apart from one another. This allows air flow from an air inlet 17 to an air outlet 18 formed in the outer wall 9 of the cask 14.

It is necessary to have air flow passing over the canister 12 to maintain fuel temperature below regulatory limits.

It is envisaged that the spent fuel rods 13 may be stored within container 10 for many decades. This means that it may be prudent to be able to provide for monitoring the contents of the canister regularly and reliably over these time scales to assist in demonstrating and confirming safe confined storage conditions to government regulatory officials.

By means of the present invention it is possible to detect the leakage of oxygen from the surrounding air into the helium atmosphere with a sealed canister in a non-intrusive manner.

By means of the present invention, the atmosphere of the canister is probed with ultrasonic signals. An ultrasonic signal transmitted into the canister will emerge from the canister, and by measuring changes in the ultrasound signature of the received signal produced by any oxygen influx, presence of oxygen may be detected.

In particular, changes in sound velocity, attenuation, resonant frequencies and structures may indicate oxygen leakage into the canister.

Additionally or alternatively variations in pressure within the canister may be monitored by detecting similar variations with pressure.

Additionally or alternatively, as xenon and krypton gases may also be released during storage of spent fuel within the sealed canister in the event of failure of fuel rod cladding it, it is desirable to be able to monitor relatively small variations in the levels of such gases within the helium atmosphere. These affects can also be monitored by suitable consideration of their effect on the ultrasound investigation.

For an ideal gas the sound velocity is given by:

$$v = \left(\frac{\gamma r T}{\rho}\right)^{1/2} \quad (1)$$

where $\gamma$=ratio of specific heats; r=gas constant; T=temperature; $\rho$=molecular weight.

For a binary mixture $\gamma$, m are proportionally modified.

As can be seen from equation (1) a variation in $\rho$ results from a variation in the relative He, $O_2$ composition.

Thus at 30° C. a complete change of atmosphere from He ($\rho$=4, v=1024.7 ms$^{-1}$), to oxygen ($\rho$=16, v=332 ms$^{-1}$) leads to $v_0/v_{He}$=¼ (or $\delta v \approx 660$ ms$^{-1}$.

Calculations indicate that for a 10:90, $O_2$:He mixture the sound velocity would be 764.4 ms$^{-1}$ i.e., a change of 260.3 ms$^{-1}$ ($\approx$25%) from pure He. This variation is easily detectable experimentally and is particularly suited to monoatomic gases, as is the case in the surrounding gas for spent fuel rod storage.

Equation (1) also indicates that the velocity scales with T as it does with p so that a temperature change from 30 to 300° C. would approximately lead to a velocity increase of x(3→4). As a consequence of this variation it is of the utmost importance in many applications to provide for an accurate compensation for any temperature variation between measurements. This can be achieved by direct measurement of temperature conditions, with appropriate compensation for changes. However, it is a particularly significant advantage of the present invention that investigation at a number of frequencies can also determine temperature and thus account for it.

Pressure variations are, however, sufficiently small to have no meaningful effect.

As well as allowing consideration of $O_2$ levels in the He atmosphere, any Xe, Kr released from the fuel would also affect $\rho$ (for Xe, $\rho$=131; Kr, $\rho$=84). Proportionately smaller amounts of Xe, Kr could produce significant sound velocity changes of the cask atmosphere due to further variation in $\rho$ and hence v.

The sonic velocity will vary with both frequency and gas pressure. The variation is due to visco thermal, and in the case of diatomic gases, vibrational and rotational relaxation effects.

As well as variations in the speed of the ultrasound travel, variations in the attenuation of the sound wave can be expected. The attenuation, $\alpha$, of a soundwave in a gas is usually quoted in terms of the parameter:

$$\left(\frac{\alpha p}{f^2}\right)$$

where ($\alpha$=absorption coefficient; p=gas pressure; $f$=frequency).

The total absorption in a binary gas mixture in which one component is polyatomic is the sum of three terms:

$$\frac{\alpha p}{f^2} = F_1, \text{(viscosity, thermal conduction)} + F_2, \text{(diffusion)} + F_3$$

(vibration/rotation energy relaxation).

As a variation in the components present changes α the attenuation effects can also, therefore, be used for also detecting differences in concentration of two binary components and for distinguishing between different contaminants and temperature effects.

Thus, for example (αp/f) for He and a 10:90 $O_2$ He mixture are 0.525 and 1.546 respectively so that a 10% oxygen contamination would produce a factor of 3× change.

The above mentioned theoretical techniques can be deployed according to the present invention in a variety of different manners. In the following examples particular emphasis is placed on the monitoring of canisters for spent nuclear fuel.

Figure 2:
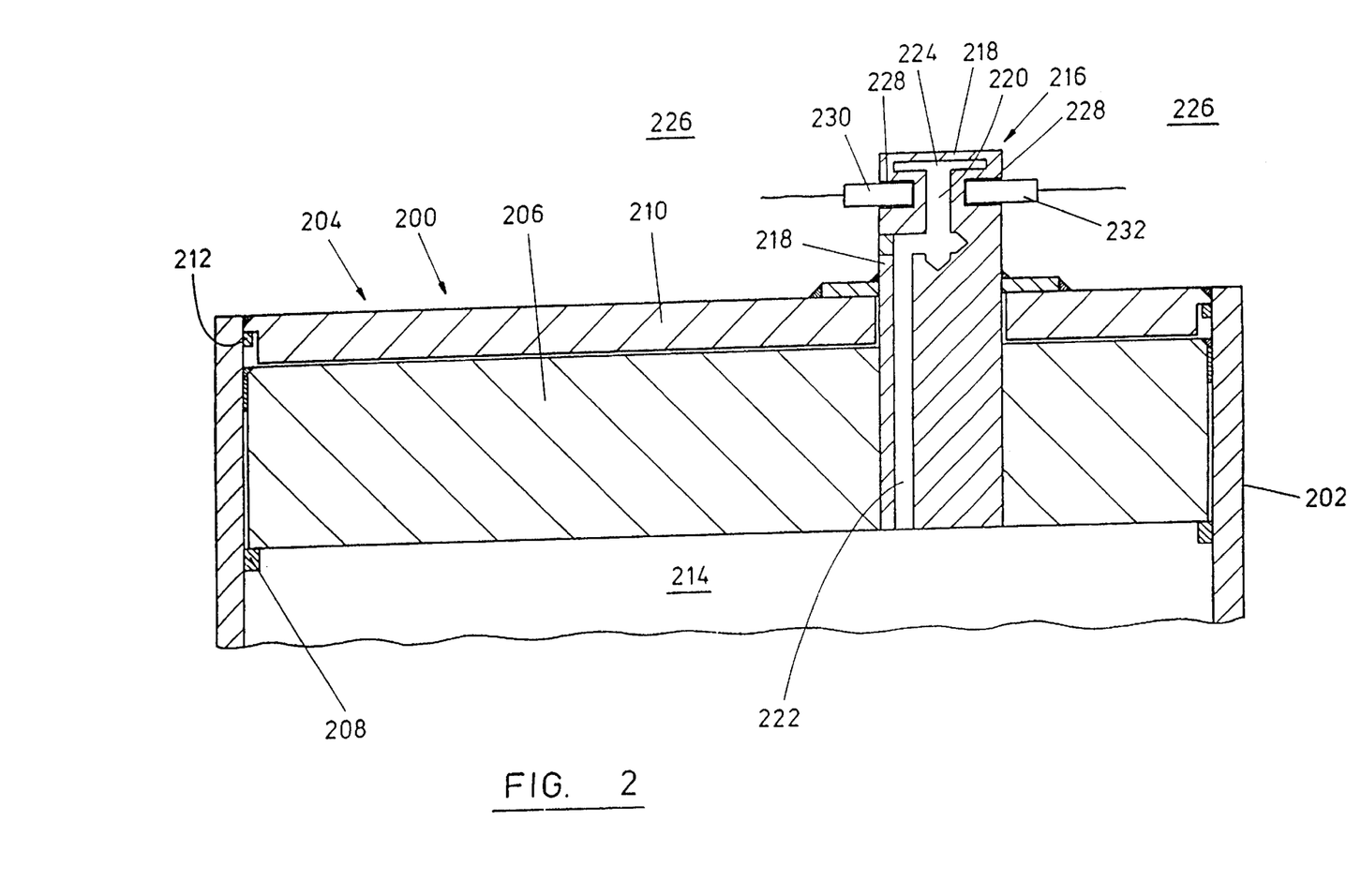
FIG. 2 is a partial cross-sectional view of the top portion of a spent fuel canister illustrating a further embodiment of the invention

The embodiment illustrated in FIG. 2 shows the top portion of a canister of the general type designated 12 in FIG. 1. The canister 200 comprises a cylindrical side wall 202 and lid structure 204. The lid structure 204 is formed of an inner shield lid 206, which rests on lip 208, and an outer structural lid 210, which rests on lip 212. Both the shield lid 206 and structural lid 210 are welded in position with gas tight welds. The spent fuel rods are contained in the volume 214 below the shield lid 206.

Mounted on the structural lid 210 is the monitor housing 216. The housing 216 provides a structural wall thickness 218 around the monitoring location 220. The structural wall thicknesses required to met regulatory standards vary for materials (for instance 25 mm thickness for carbon steel, 19 mm thickness for stainless steel). The monitoring location 220 consists of a cylindrical bore 222 leading from the cavity volume 214 to the monitoring location 220 and beyond to a "top hat" configuration 224. The bore 222 is fully enclosed by the housing 216 to maintain the isolation of the cavity volume 214 and its helium atmosphere from the surrounding cooling air volume 226. The bore 222 is dog leg for shielding purposes.

On either side of the monitoring location are two bores 228 in the housing 216, the bores receiving the transmission transducer 230 and receiver 232. Ultrasound is passed through the monitoring location 220 and the appropriate characteristics of its passage are measured to give the desired information.

Although physically remote from the cavity volume 214 measurements at the monitoring location 220 are accurate representations of the cavity volume due to the extreme mobility of helium. Additionally the time period between measurements is likely to be days or more with very gradual or no change expected between tests, as a consequence this gas volume is fully representative.

Figure 3:
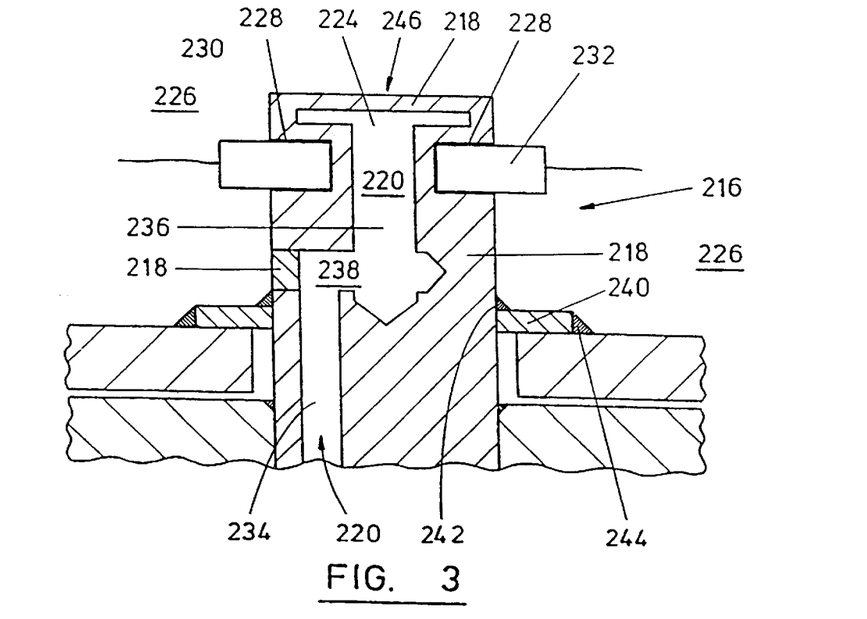
FIG. 3 is a detailed cross-sectional view of the sensor component of FIG. 2.

As illustrated in more detail in FIG. 3, the bore 222 consists of a main bore 234 and subsidiary bore 236 connected by a cross-bore 238. The housing 216 is mounted on the structural lid 210 by plate 240 which is welded thereto by welds 242 and 244. To ensure good ultrasound contact between the transducers 230, 232, gel is provided on the end faces of the bores 228. As alternatives to flat ends for the bores, concave or convex faces can be used to focus the ultrasound.

The top hat shape to the upper section 246 of the bore 222 is so shaped for the purposes of damping noise signals spreading from the source to receiver transducer.

The transducers 230, 232 face each other across a gap of 5 to 6 cm in the case of a 40 kHz ultrasound system.

As an alternative to direct contact between the end of the bore and the transducer, the transducers may be provided with plates connected to the end surfaces of the transducers by spigots.

Whilst FIGS. 2 and 3 imply the use of a unitary element to form the housing 216 acoustic filtering advantages can be obtained by forming the housing of different materials. The different materials may filter the noise signal and/or give enhancing directional effects.

Acoustic filtering of the signals arising in the system, through appropriate structural configurations, is important in ensuring that the quicker signal transmission of the ultrasound through the housing does not give a noise signal which swamps the slower transmission of the ultrasound through the gas being monitored. The frequency of the ultrasound, the gap between the transducers, the relative thicknesses of the intervening walls, side walls and surrounding walls all, individually and together, effect the system and can be used to effect its operation accordingly.

The transducers 230, 232 are only introduced once the fuel has been loaded, as part of the loading procedure will involve the complete emersion of the canister 200 including the housing 216 in the cooling pond where the fuel is stored.

The transducers 230, 232 and accompanying electronics to which they are attached (not shown) are removed from the housing 216 between tests to reduce the potential for radiation damage of the transducers and their surrounding electronics and also to reduce the number of measuring equipment sets that are needed. As tests on the gas content may be days, months or even years apart, it is wasteful to leave that part of the equipment in-situ during that time.

In general, the measurement system is checked against a known standard or other calibration technique, before and/or after being used, to ensure correct operation. True verification of the systems correct operation can therefore be provided, away from the canister if desired.

To give accurate measurements the temperature of the monitoring location is measured. The temperature monitoring can be effected by a thermal couple attached to the housing at a consistent position between tests. A pair of thermocouple, one at substantially the same location as the transmitting transducer, one at substantially the same position as the receiver are preferred in this regard. There is no need for the temperature monitoring apparatus to intrude into the internal cavity (thereby avoiding leakage site generation) provided a consistent correction is applied. The output from the thermocouples are fed to the processing electronics to provide a correction signal. This signal can be used to correct the gas monitoring result to ensure that variations in temperature, for instance cooling of the canister over the years, does not give a false reading of gas change.

Measurement of pressure within the cavity may also be desirable to remove the effect of any pressure variation from the signal analysis in a similar manner to that discussed above for temperature.

Figure 4:
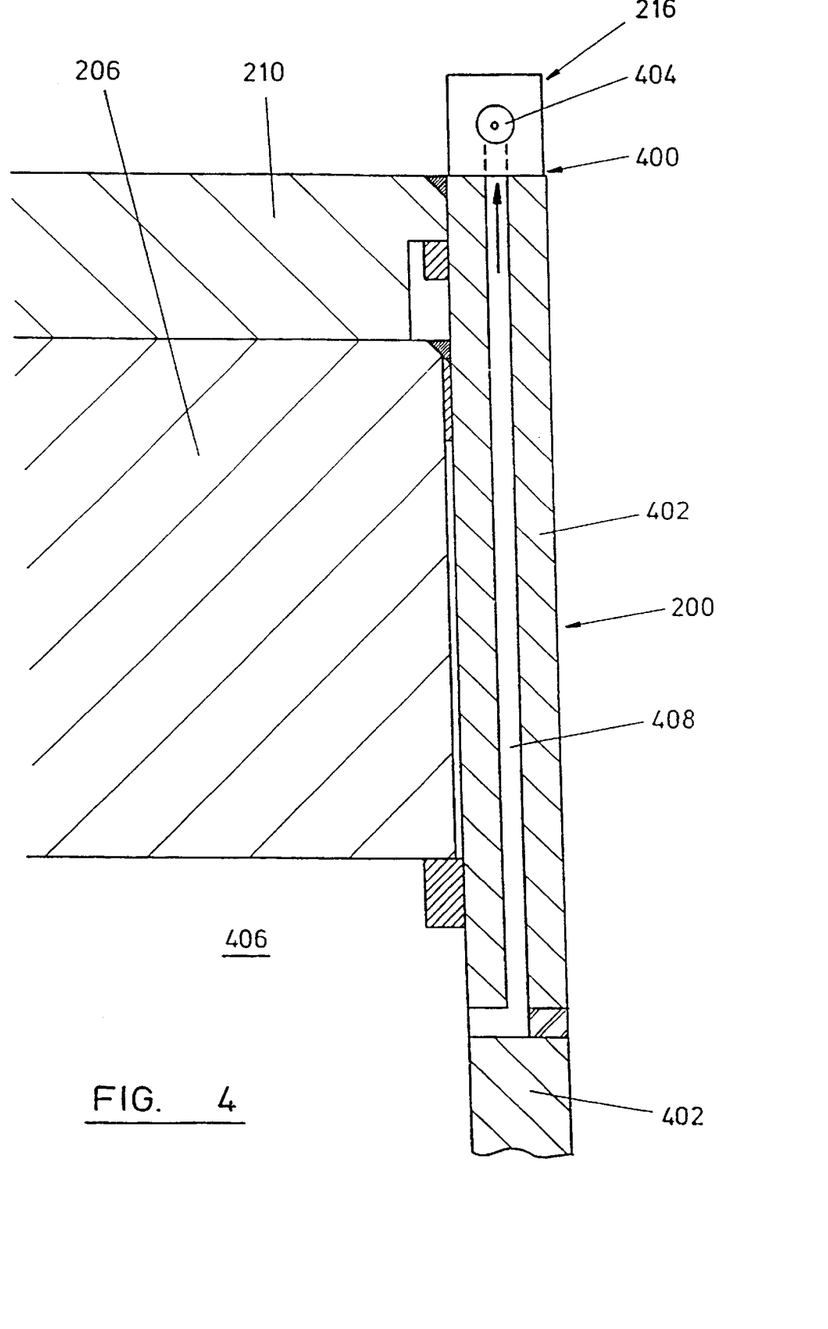
FIG. 4 is a partial cross-sectional view of the top portion of a spent fuel canister illustrating a still further embodiment of the invention.

In FIG. 4 an alternative positioning of the housing 216 is provided on the top wall 400 of the cylindrical wall 402 of the canister 200. This provides the necessary clearance for the introduction of the shield lid 204 and structural lid 210 following introduction of the spent fuel. The connection between the monitoring location 404 and the cavity volume 406, in this case, is provided by a bore 408 in the cylindrical side wall 402. The monitoring operates in a similar manner to that outlined above.

Figure 5:
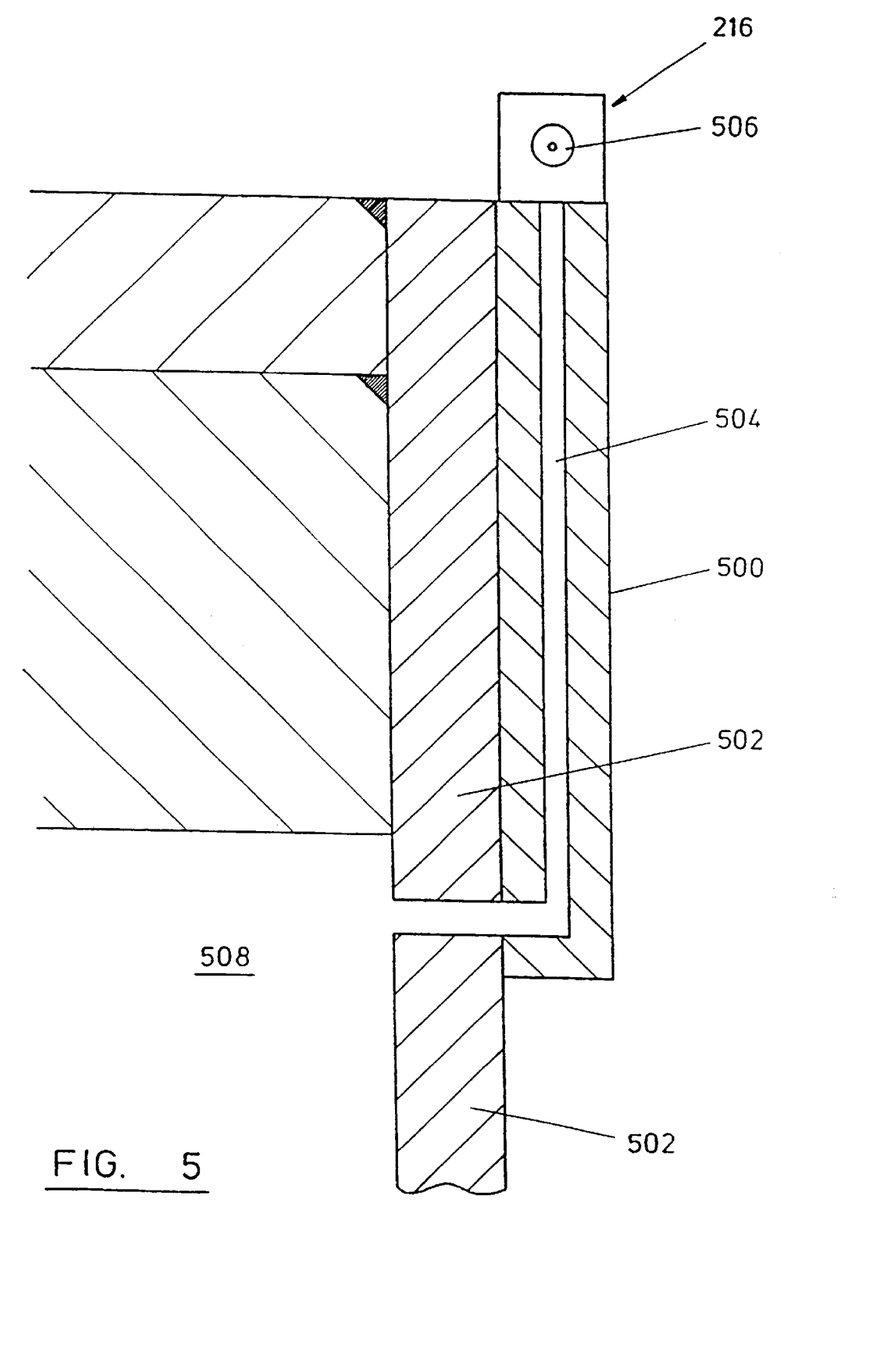
FIG. 5 is a partial cross-sectional view of the top portion of a spent fuel canister illustrating a yet further embodiment of the invention.

In FIG. 5 the housing 216 is provided on the end of a bore carrying element 500 fixed to the side wall 502 of the canister. The bore 504 in this element 500 connects the measuring location 506 to the cavity volume 508.

Figure 6:
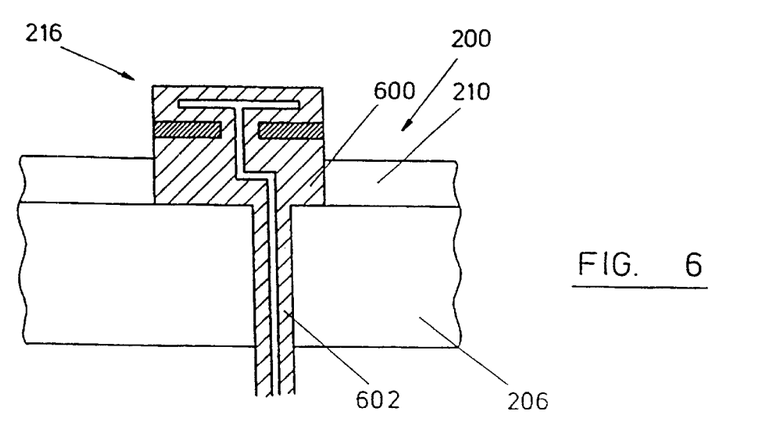
FIG. 6 illustrates a variation on the top portion of the canister of FIG. 2.

In the alternative form of mounting for the housing 216 of FIG. 2, illustrated in FIG. 6, the housing base 600 penetrates the structural lid 210 and rests on the shield lid 204. In this way only the, relatively narrow, bore carrying element 602 needs to penetrate the shield lid 204, thereby reducing the variation between the existing canister and a canister 200 embodying the present invention.

Figure 7:
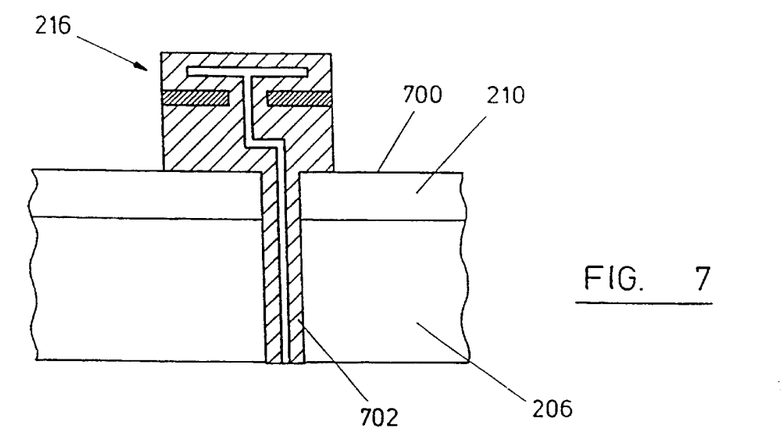
FIG. 7 illustrates a further variation on the top portion of the canister of FIG. 2.

In the still further alternative form of mounting for the housing 216 shown in FIG. 7, the housing 216 rests on the top surface 700 of the structural lid 210. In this way the structural lid 210 and the shield lid 204 are both only penetrated by the relatively narrow, bore carrying element 702.

In certain instances the housing must have quite deep bores for the transducers to give sufficient signal introduction and sufficient signal collection capability for the best results to be achieved. Transducers of 6 to 8 inches in length and 3 inches in diameter are suitable for many applications. In general the longer the transducer the better the filtering that is achieved. The FIG. 4 and FIG. 5 type embodiment positioning of the housing can be a problem in this regard.

Figure 8:
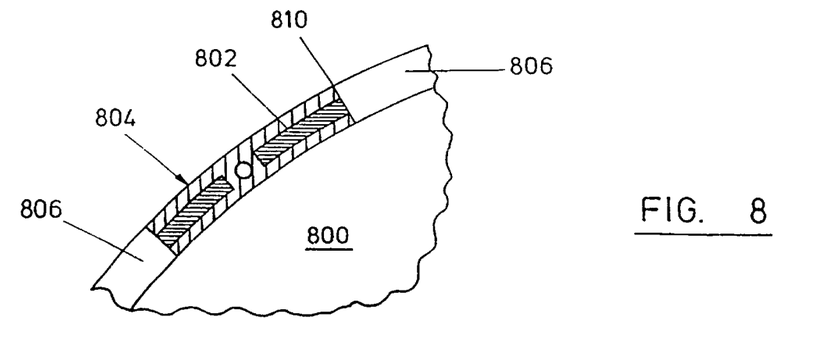
FIG. 8 illustrates in plan view a variation on the embodiment of 4.

FIG. 8 illustrates an embodiment of the invention which provides the necessary clearance for the lids 800, but provides the necessary bore length 802 by extending the housing 804 around and within the profile of the cylindrical wall 806. This form of housing 804 also avoids intrusion of the housing 806 outside the cylindrical profile, an important consideration given the very limited clearances which exist between the outside 810 of the cylindrical wall 806 and other parts of the apparatus during transfer of the canister from the cooling pond, where it receives the spent fuel, and the concrete cask.

The FIG. 8 and other embodiments of the invention illustrate a transmission system for determining the ultrasonic effects. This and the other embodiments of the invention can, however, use reflective measurements. In such cases a substantially coincident transmission and reception location may be provided or the transmission and reception locations may be provided close to one another, but separated by a small angle. The opposing side of the bore containing the gas may be shaped to promote ultrasound reflection.

Figure 9:
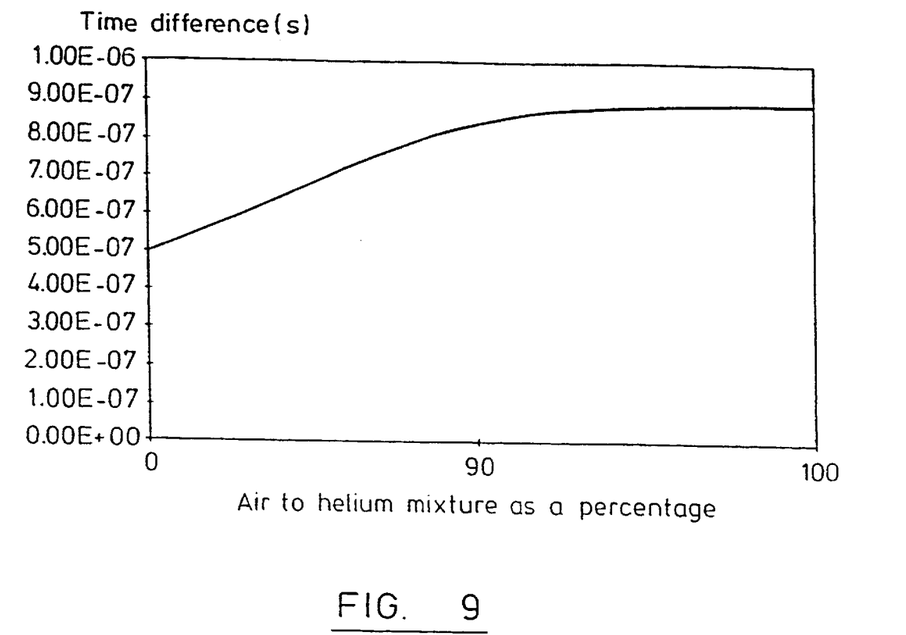
FIG. 9 displays experimental results for time difference between transmission and reception for ultrasound signals with varying gas composition.

To illustrate the techniques effectiveness reference is made to FIG. 9 which displays the time difference between signal emission and reception against different gas compositions for air to helium mixtures.

Figure 10:
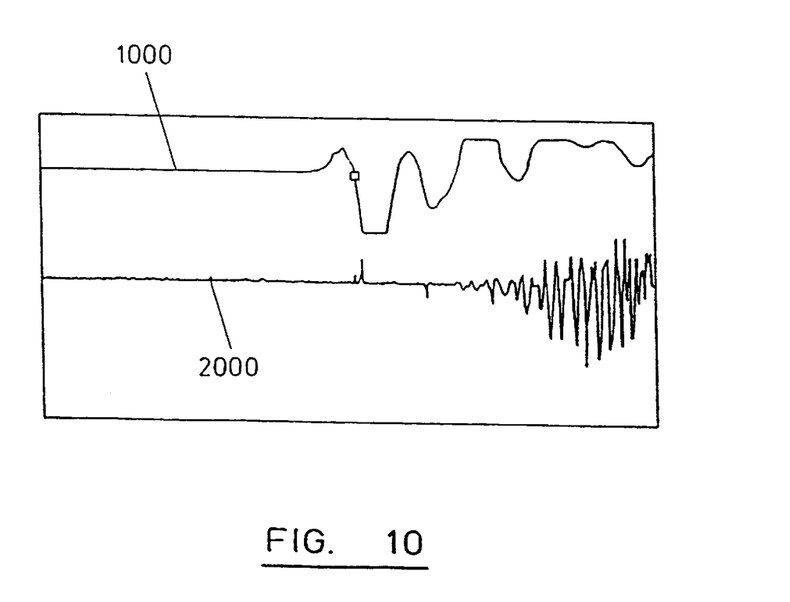
FIG. 10 illustrates a typical input signal and a typical detected signal.

In FIG. 10 a typical input signal (solid line 1000) and a typical detected signal (solid line 1002) are illustrated. The detected form includes both that part of the signal which crosses the gas gap to the detector and also a significant noise signal which travels around through the housing itself to reach the detector.

To achieve the necessary accuracy in the results using the techniques of the present invention it is desirable to apply certain signal processing techniques. Preferred embodiments of the invention use Fast Fourier Transform method or the new technique of chromatic filtering to extract the desired information from the detected signal.

Figure 11A:
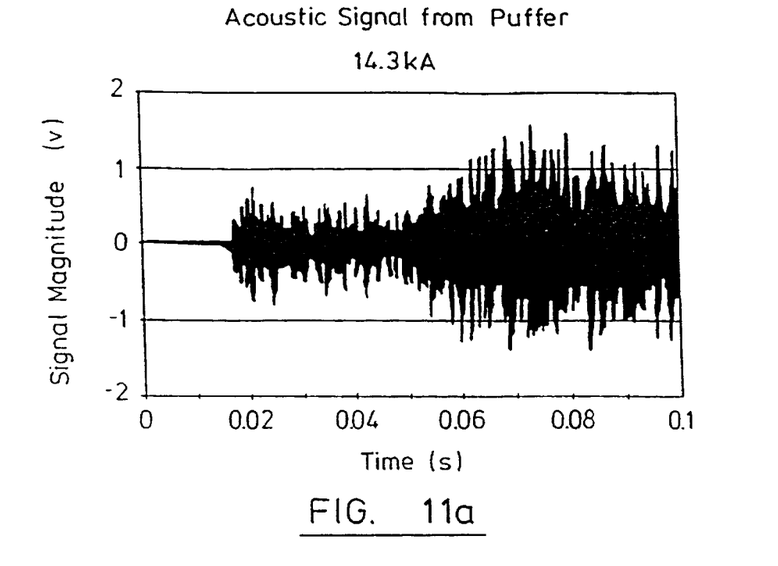
FIG. 11a to 11c illustrate the application of a signal processing technique suitable for use in the present invention.
Figure 11B:
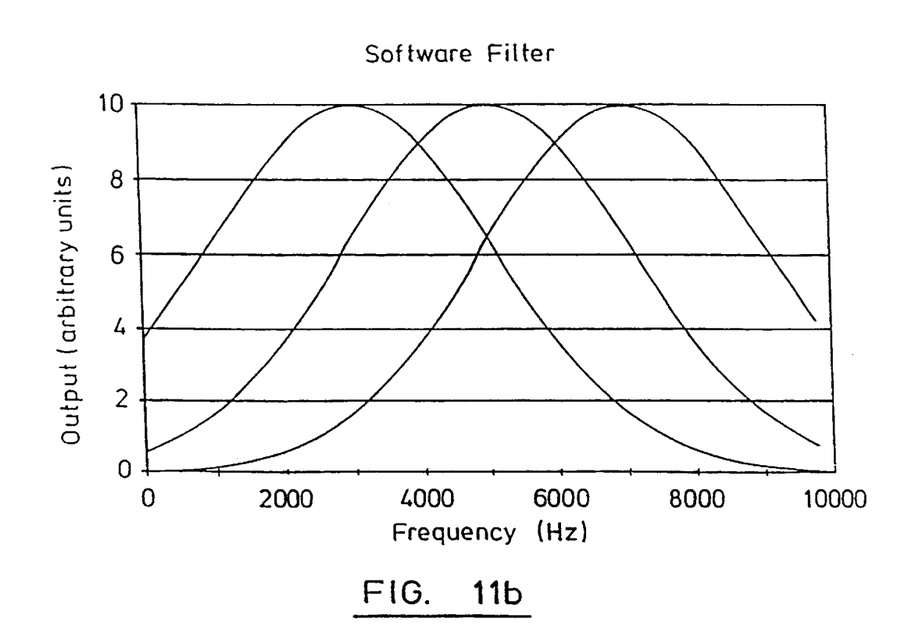
Figure 11C:
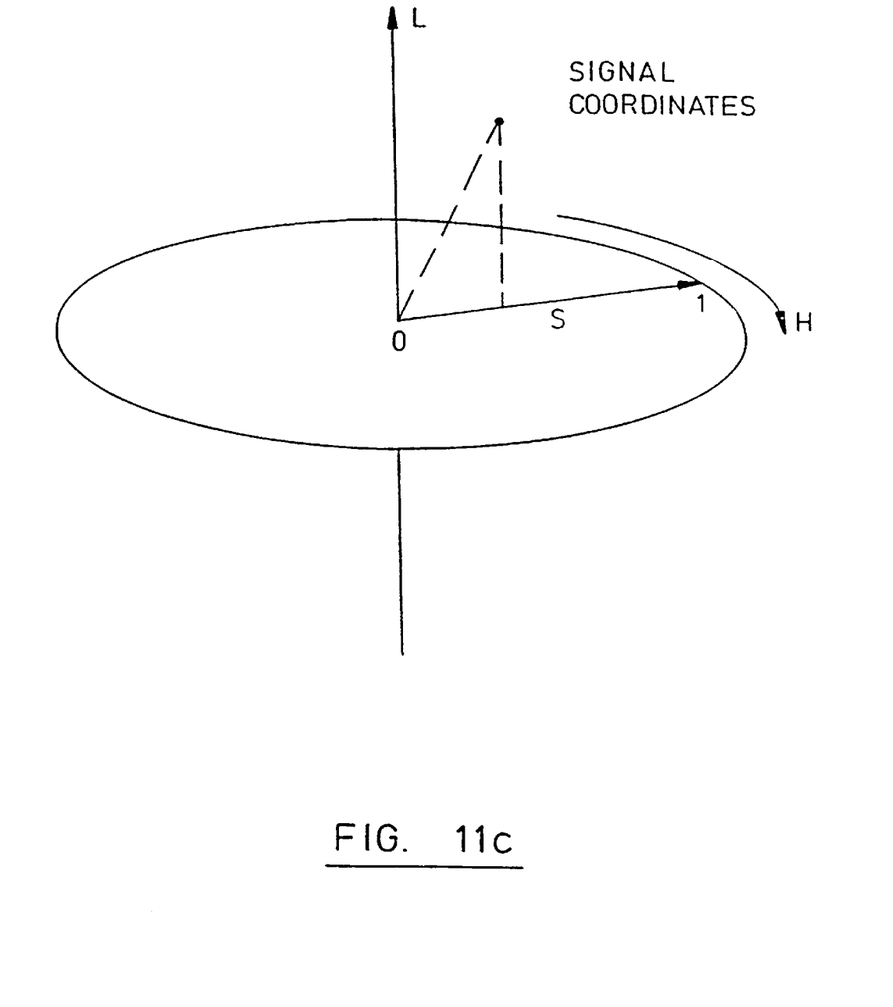

The technique of chromatic processing is illustrated in FIG. 11a to 11c.

Chromatic filtering of a signal (FIG. 11(a)) involves the use of n nonorthogonal Gaussian processors (FIG. 11(b)) which cover the range of frequencies covered by the signal. In one embodiment n=3 the outputs of the Gaussian processors are manipulated algorithmically to provide at each instant in time a signal detection in terms of three parameters namely the nominal energy content of the signal, the dominant frequency and the effective bandwidth. The signal is effectively represented by a single point in a three dimensional chromatic space defined in terms of these parameters (FIG. 11(c)).

In this embodiment the conditions within the fluid containing canister are defined by the position of the signal defining point in chromatic space.

Deviation of this point from its nominal equilibrium position is indicative of changed conditions in the canister. Experience with other measurements indicate that:

The type of fault producing a change is characterised by the direction of the deviation from equilibrium.

The extent of fault development is characterised by the magnitude of the change.

Fault types and their characteristics are determined empirically from a prior calibration.

From the above mentioned three parameters the time of flight of the ultrasound through the gas gap can be determined in the desired manner. The process also reveals significant other information on differential attenuation and propagation which can be used.

It is likely that some resonant frequencies of the gas containment facility will depend upon the mass density of the gas within the structure. There is, therefore, the possibility of exploring whether such an approach could yield further information about the composition of the gas atmosphere.

At one extreme such an approach might give a better "integrated atmosphere" indication since major parts of the casket volume would have an effect (rather than simply a "line of sight", local indication). At the other extreme, a "line of sight" approach may well, in any case, excite resonances which will need to be taken into account in the analysis of test results.

Sound velocity and attenuation co-efficient may be evaluated in detail for the gaseous components He, $O_2$, $N_2$, Xe and Kr separately in various combinations for a range of acoustical frequencies.

The purpose of these calculations is to determine the extent to which the different atmospheric combinations within the fuel storage canister might be distinguished.

Differences in acoustical velocities will indicate the presence of different species. Differences in attenuation coefficient will indicate temperature effects, whilst the frequency dependence of the velocity and attenuation coefficient may enable different contaminants to be distinguished.

Calculations used to determine the composition of a gas content within a canister will take into account the structural considerations of the canister. Some of the resonances will depend on the mass density of the gaseous atmosphere.

When putting the invention into practice it is necessary to define a range of sonic frequencies to be used in order to maximise trends and variations between different contaminants.

For example, it may be possible to discriminate between oxygen and Xe/Kr on the basis of the rotational energy and relaxation of the oxygen molecule if sufficiently high frequencies are employed.

In addition, for "line of sight" measurements sonic attenuation will have to be minimised for appropriate choice of frequency when taking into account the structure.

The acoustic transducer could be either electromagnetic, a capacitance, or any other type of transducer.

Depending on the choice of source and detector, it may be advantageous to use optical fibres in order to detect the received signal.

Although the present invention has been described primarily with reference to use in connection with monitoring of spent nuclear fuel contained within fuel canisters, the invention would also be applicable in areas where materials which are harmful to human beings are being handled or transported, for example, toxins, biological materials and medical materials.

What is claimed is:

1. A method for non-intrusively monitoring the gaseous contents of a sealed container comprising:

transmitting an ultrasonic transmitted signal through a wall of the sealed container into the gaseous contents of the container from a transmitter;

receiving an ultrasound signal from within the container using a receiver; and analyzing the changes in the received ultrasound signal so as to deduce the level of one or more components of the gaseous contents of the container due to the way in which the transmitted signal is modified into the received ultrasound signal by the gaseous contents of the container, without having to unseal the container, and wherein the deduced level of one or more components of the gaseous contents of the container is corrected for temperature by performing the method at a number of frequencies;

providing a structural wall so as to isolate the gaseous contents of the container from the transmitter and the receiver, the structural wall being separate from the the one or more components of the gaseous contents of the container arising from a leakage of gas into the gaseous contents of the container, and wherein the transmitter and/or receiver can be removed without having to unseal the container.

2. A method according to claim 1 wherein the level of one or more components being deduced is the level of air ma positive helium atmosphere of at least 1.1 atmospheres, air arising from a leakage of the atmosphere surrounding the sealed container into the container atmosphere.

3. A method according to claim 1 wherein the sealed container contains nuclear fuel rods.

4. A method according to claim 3 wherein level of one or more components being deduced is the level of the act of transmitting includes the gaseous contents xenon and/or krypton in air and helium, the xenon and/or krypton arising from the leakage of fission product gases from the nuclear fuel rods within the sealed container.

5. A method according to claim 3 further comprising deducing whether the gaseous contents includes oxygen and/or fission product gasses from the fuel rods.

6. A method for non-intrusively monitoring the gaseous contents of a sealed container comprising:

transmitting an ultrasonic transmitted signal through a wall of a monitoring housing, from a transmitter provided in the monitoring housing, and into a monitoring location, the monitoring location being in sealed fluid communication with the gaseous contents of the sealed container;

receiving an ultrasound signal from within the monitoring location using a receiver provided in the monitoring housing; and analyzing the changes in the received ultrasound signal so as to deduce the level of one or more components of the gaseous contents of the container due to the way in which the transmitted signal is modified into the received ultrasound signal by the gaseous contents of the container, without having to unseal the container or the monitoring housing;

providing a structural wall as a part of the monitoring housing so as to isolate the gaseous contents of the monitoring location and container from the transmitter and the receiver, the transmitter and receiver being separate from the monitoring housing, the one or more components arising from a leakage of gas into the gaseous contents of the container.

7. A method according to claim 6 in which the monitoring location is connected to the gaseous contents within the container via a passageway.

8. A method according to claim 6 in which the passageway is provided with one or more dog legs.

9. A method according to claim 7 in which the passageway passes through the lid of the container.

10. A method according to claim 6, wherein the act of analysing includes measuring the sound velocity and attenuation of the transmitted signal and/or the received signal.

11. A method according to claim 10 further comprising the act of measuring the sound velocity and attenuation of the transmitted signal at more than one frequency.

12. A method according to claim 6, wherein the act of analysing includes measuring the velocity of both a "line of sight" received signal and a reflected signal.

13. A method according to claim 6 wherein the act of analysing includes subjecting the received signal to a signal processing to extract the desired information, the signal processing involving Fast Fourier Transformation and/or chromatic based processing.

14. A method according to claim 13 in which chromatic based processing is employed, the signal processing involving the application of one or more Gaussian processors to the received signal, the processors being non-orthogonal.

15. An apparatus for non-intrusively monitoring the gaseous contents of a sealed container, the apparatus comprising:

a transmitter for transmitting an ultrasonic signal through a wall of a sealed container to read, an ultrasonic signal through the wall of a monitoring housing of the sealed container container into the gaseous contents of the container;

a receiver for receiving an ultrasound signal from within the container:

an analyzer for analyzing changes in the received ultrasound signal so as to deduce the level of one or more components of the gaseous contents of the container due to the way in which the transmitted signal is modified into the received signal by the gaseous contents of the container, without having to unseal the containers a structural wall being provided so as to isolate the gaseous contents of the container from the transmitter and the receiver, the structural wall being separate from the transmitter and receiver, the one or more components arising from a leakage of gas into the gaseous contents of the container.

16. An apparatus according to claim 15 wherein the source of the transmitter is positioned outside the container, and the receiver is positioned outside the container.

17. An apparatus according to claim 16, wherein the transmitter is positioned within the container.

18. An apparatus according to claim 17, wherein the transmitting means is activated by a signal transmitted from outside the container.

19. An apparatus according to claim 15, wherein the transmitter comprises a tuning fork or resonant cavity.

20. A method according to claim 6 in which the monitoring location is provided within a housing, the housing being provided with a volume of gas on the distal side of the monitoring location relative to the container, the volume of gas on the distal side having a greater extent, measured perpendicular to the passageway leading from the container to the monitoring location, than the extent of the monitoring location itself.

21. An apparatus according to claim 15, in which the transmitter and/or receiver are provided in bores in the housing.

* * * * *

UNITED STATES PATENT AND TRADEMARK OFFICE
CERTIFICATE OF CORRECTION

PATENT NO. : 6,680,994 B2
DATED : January 20, 2004
INVENTOR(S) : Jones et al.

It is certified that error appears in the above-identified patent and that said Letters Patent is hereby corrected as shown below:

Column 2,
Line 58, change "ultra-sonic" to -- ultrasonic --

Column 5,
Line 15, following "oxygen," insert -- and --

Column 6,
Line 27, change "ultra-sound" to -- ultrasound --
Line 49, change "canister for example" to -- canister, for example, --
Line 60, change "of canister" to -- of a canister --

Column 7,
Line 65, following "Alternatively" insert -- , --

Column 8,
Equation 1, change "$\upsilon$" to -- v -- as shown in the application.
Line 15, change "where$\gamma$=ratio" to -- where $\gamma$=ratio --
Line 23, change "(or $\delta$v ≈ ms$^{-1}$" to -- (or $\delta$v ≈ ms$^{-1}$) --
Line 31, change "p" to -- p --
Line 52, change "visco thermal" to visco-thermal --
Line 64, change "pressure;f=" to -- pressure; f= --

Column 9,
Line 12, change "O$_2$ He" to -- O$_2$:He --
Line 31, change "met" to -- meet --
Line 47, change "214" to -- 214, --
Line 50, change "Additionally" to -- Additionally, --
Line 52, change "tests, as a consequence" to -- tests. As a consequence, --

Column 10,
Line 6, change "216" to -- 216, --
Line 17, change "effect" to -- affect --
Line 36, change "measurements" to -- measurements, --
Line 38, change "thermal couple" to -- thermocouple --
Line 40, change "theremocouple" to -- thermocouples --

UNITED STATES PATENT AND TRADEMARK OFFICE
CERTIFICATE OF CORRECTION

PATENT NO. : 6,680,994 B2
DATED : January 20, 2004
INVENTOR(S) : Jones et al.

It is certified that error appears in the above-identified patent and that said Letters Patent is hereby corrected as shown below:

Column 11,
Line 4, change "the, relatively" to -- the relatively --
Line 64, change "embodiment n=3 the outputs" to -- embodiment, n=3, the outputs --
Line 67, change "parameters namely the" to -- parameters, namely, the --

Column 13,
Line 25, change "from the the" to -- from the --
Line 32, change "ma" to -- in a --

Column 14,
Line 39, change "container container" to -- container --
Line 63, change "Claim 16" to -- Claim 15 --
Line 66, delete "means"

Signed and Sealed this

Twelfth Day of October, 2004

JON W. DUDAS
*Director of the United States Patent and Trademark Office*